US009585095B2

(12) United States Patent
Merlin et al.

(10) Patent No.: US 9,585,095 B2
(45) Date of Patent: Feb. 28, 2017

(54) METHODS AND DEVICES FOR ENHANCED POWER SAVE PROTOCOL

(71) Applicant: QUALCOMM Incorporated, San Diego, CA (US)

(72) Inventors: Simone Merlin, Solana Beach, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 14/536,373

(22) Filed: Nov. 7, 2014

(65) Prior Publication Data
US 2015/0131508 A1   May 14, 2015

Related U.S. Application Data

(60) Provisional application No. 61/902,719, filed on Nov. 11, 2013.

(51) Int. Cl.
H04W 52/02  (2009.01)
(52) U.S. Cl.
CPC ... H04W 52/0216 (2013.01); H04W 52/0206 (2013.01); Y02B 60/50 (2013.01)
(58) Field of Classification Search
CPC .......... H04W 52/0216; H04W 52/0206; Y02B 60/50
See application file for complete search history.

(56) References Cited

U.S. PATENT DOCUMENTS

| 7,688,844 | B2* | 3/2010 | Nishimura | H04W 74/06 370/338 |
| 7,796,545 | B2 | 9/2010 | Surineni et al. | |
| 2005/0141543 | A1* | 6/2005 | Nishimura | H04W 74/06 370/443 |
| 2011/0019555 | A1* | 1/2011 | Gotoh | H04W 52/0241 370/252 |
| 2012/0188925 | A1* | 7/2012 | Lee | H04B 7/0452 370/311 |
| 2014/0334368 | A1 | 11/2014 | Zhou et al. | |
| 2015/0009879 | A1 | 1/2015 | Kim et al. | |
| 2015/0036572 | A1* | 2/2015 | Seok | H04W 52/0216 370/311 |
| 2015/0282211 | A1* | 10/2015 | Zhang | H04W 74/06 370/329 |

(Continued)

FOREIGN PATENT DOCUMENTS

EP    1654837 A2    5/2006
WO   WO-2007082235   7/2007

(Continued)

OTHER PUBLICATIONS

International Search Report and Written Opinion—PCT/US2014/064821—ISA/EPO—Feb. 3, 2015.

*Primary Examiner* — Duc C Ho
(74) *Attorney, Agent, or Firm* — Knobbe, Martens, Olson & Bear, LLP

(57) ABSTRACT

Methods and devices for enhanced power save protocol are provided. In one aspect, a message to two or more stations is transmitted, the message requesting the two or more stations to transmit power save polls concurrently at a specified time. The power save polls are then received concurrently from each of the stations.

26 Claims, 9 Drawing Sheets

(56) References Cited

U.S. PATENT DOCUMENTS

2015/0382283 A1* 12/2015 Wang ................ H04W 52/0216
　　　　　　　　　　　　　　　　　　　　　370/328
2016/0183189 A1　　6/2016 Merlin

FOREIGN PATENT DOCUMENTS

WO　　WO-2013070175 A1　　5/2013
WO　　WO-2013122424 A1　　8/2013

* cited by examiner

METHODS AND DEVICES FOR ENHANCED POWER SAVE PROTOCOL

CROSS-REFERENCE TO RELATED APPLICATION

This application claims priority under 35 U.S.C. §119(e) to U.S. Provisional Application No. 61/902,719, filed Nov. 11, 2013 and entitled "METHODS AND DEVICES FOR ENHANCED POWER SAVE PROTOCOL," which is hereby incorporated by reference in its entirety.

FIELD

Certain aspects of the present disclosure generally relate to wireless communications, and more particularly, to methods and devices for enhanced power save protocol.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send channel state information feedback to the access point, it is desirable to minimize the amount of traffic to complete the uplink of the channel state information. Thus, there is a need for an improved protocol for uplink of channel state information from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises transmitting a message to two or more stations, the message requesting the two or more stations to transmit power save polls concurrently at a specified time. The method further comprising concurrently receiving the power save polls from each of the stations.

Another aspect of the disclosure provides a device for wireless communication. The device comprises a transmitter configured to transmit a message to two or more stations, the message requesting the two or more stations to transmit power save polls concurrently at a specified time. The device further comprises a receiver configured to concurrently receive the power save polls from each of the stations.

Another aspect of the disclosure provides a device for wireless communication. The device comprises means for transmitting a message to two or more stations, the message requesting the two or more stations to transmit power save polls concurrently at a specified time. The device further comprises means for concurrently receiving the power save polls from each of the stations.

Another aspect of the disclosure provides a non-transitory computer readable medium. The medium comprising instructions that when executed cause a processor to transmit a message to two or more stations, the message requesting the two or more stations to transmit power save polls concurrently at a specified time. The medium further comprising instructions that when executed cause a processor to concurrently receive the power save polls from each of the stations.

DETAILED DESCRIPTION

Figure 1:
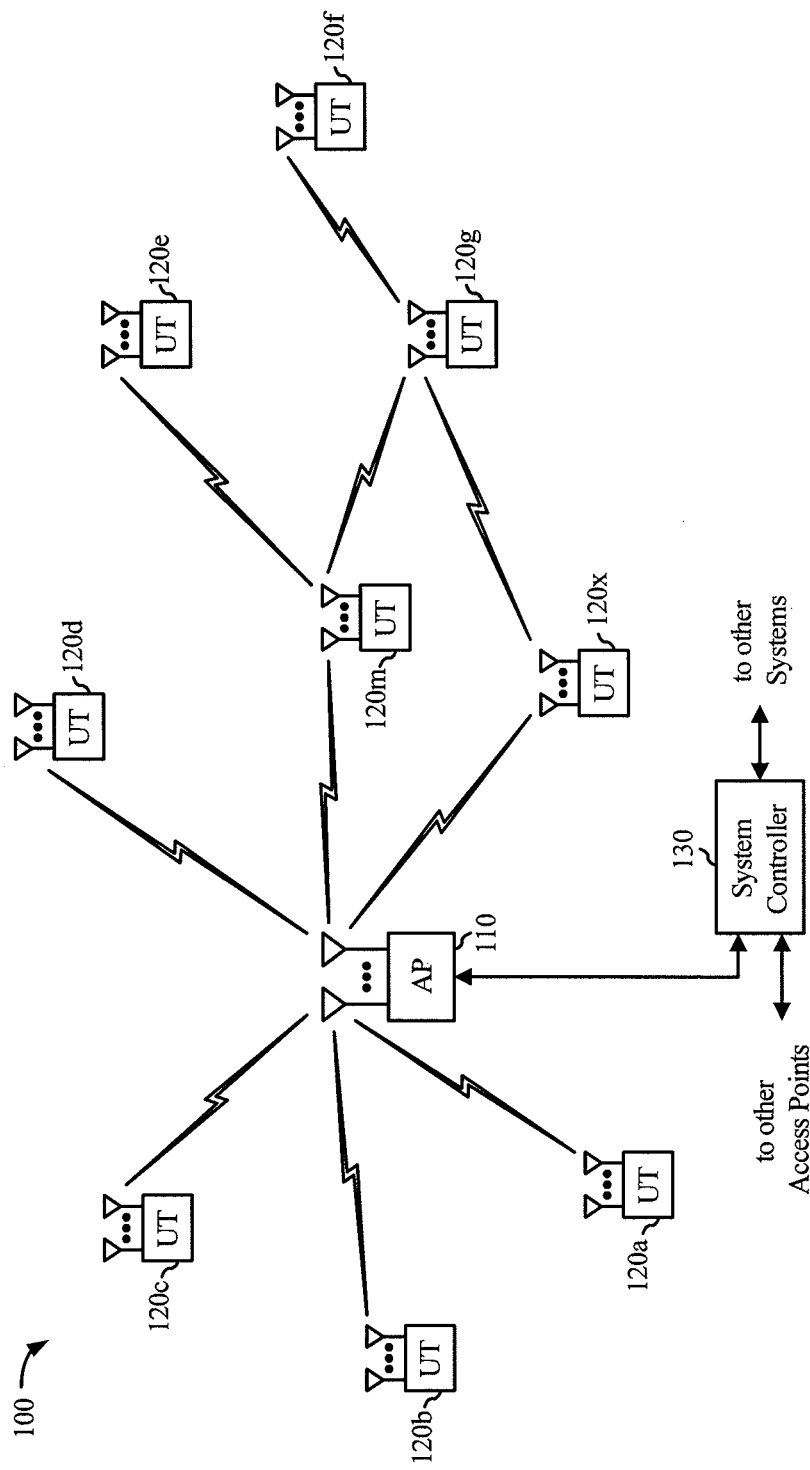
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An AP may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An STA may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point 110 is generally a fixed station that communicates with the user terminals 120 and may also be referred to as a base station or using some other terminology. A user terminal 120 or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point 110 to the user terminals 120, and the uplink (i.e., reverse link) is the communication link from the user terminals 120 to the access point 110. A user terminal 120 may also communicate peer-to-peer with another user terminal 120. A system controller 130 couples to and provides coordination and control for the access point 110 and other access points (not shown).

While portions of the following disclosure will describe user terminals 120 capable of communicating via Spatial Division Multiple Access (SDMA), for certain aspects, the user terminals 120 may also include some user terminals 120 that do not support SDMA. Thus, for such aspects, the AP 110 may be configured to communicate with both SDMA and non-SDMA user terminals 120. This approach may conveniently allow older versions of user terminals 120 ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals 120 are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal 120 may transmit user-specific data to and/or receive user-specific data from the access point 110. In general, each selected user terminal 120 may be equipped with one or multiple antennas (i.e., $N_{ut} \geq 1$). The K selected user terminals 120 can have the same number of antennas, or one or more user terminals 120 may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal 120 may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
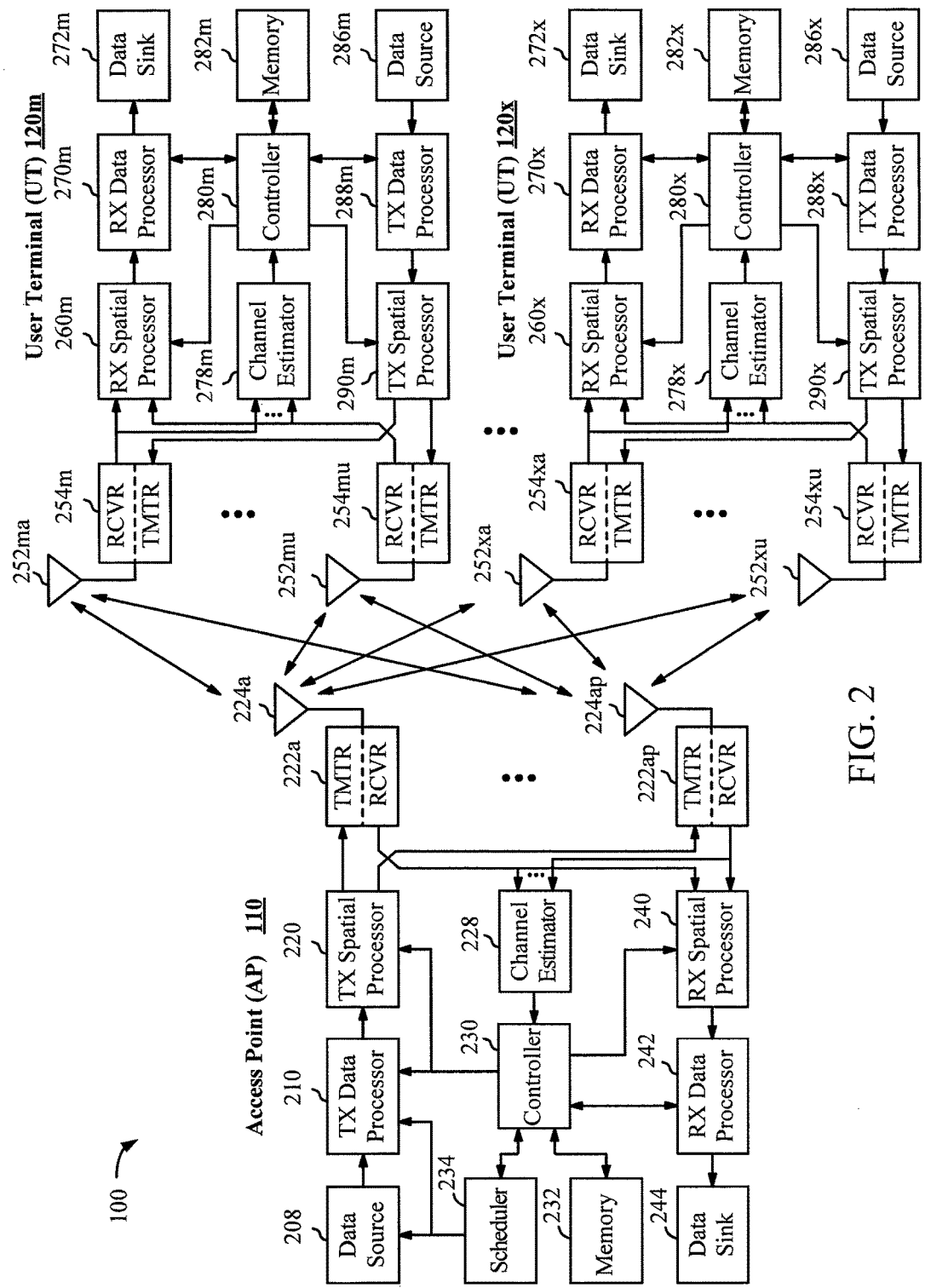
FIG. 2 is a block diagram of the access point 110 and two user terminals 120$m$ and 120$x$ in a MIMO system.

FIG. 2 is a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
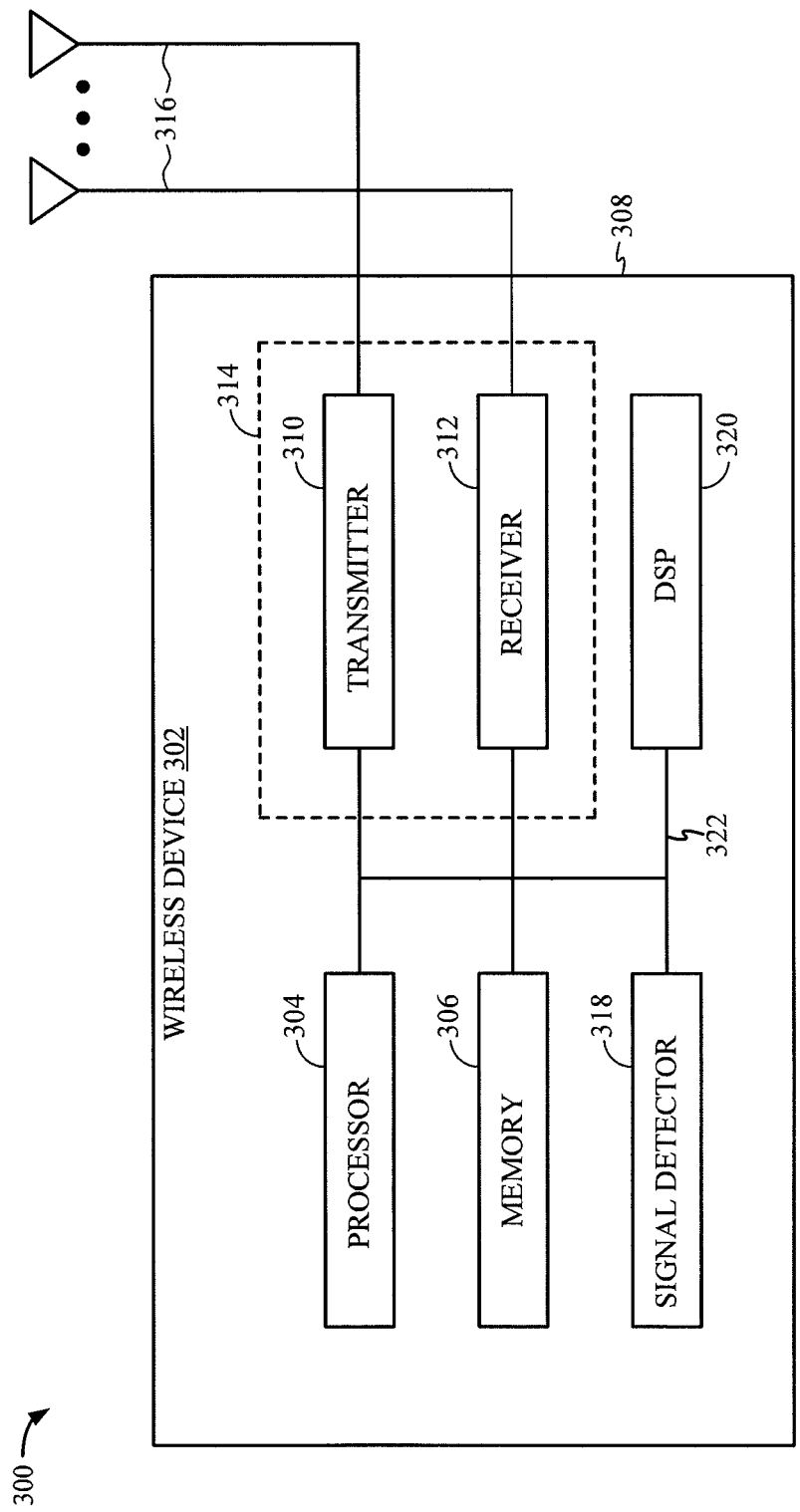
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). The wireless device 302 may also include memory 306. The memory 306 may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support concurrently transmitting uplink (UL) power save polls (PS-Polls) from multiple STAs 120 to an AP 110. In some embodiments, the UL PS-Poll may be transmitted in a multi-user MIMO (MU MIMO) system. Alternatively, the UL PS-Poll may be transmitted in a multi-user FDMA (MU FDMA) or similar FDMA system. Specifically, FIGS. 4-14 depict UL MU MIMO transmissions that would apply similarly to UL FDMA transmissions. In these embodiments, UL MU MIMO or UL FDMA transmissions can be sent simultaneously from multiple STAs 120 to an AP 110 and may create efficiencies in wireless communication. While FIGS. 4-12 show PS-Polls transmissions starting at the same time and ending at the same end time, concurrent transmission describes any transmission where at least a portion of a transmission from one wireless device is transmitted over an overlapping time with at least a portion of a transmission from another wireless device. For example, a first and second transmission may be concurrent with each other where the first transmission starts at a first time and overlaps in time with at least a portion of the second transmission which starts at a second time that is later than the first time. FIGS. 4-12 are time sequence diagrams showing data transfer between an AP 110 and multiple STAs 120. In FIGS. 4-12, the horizontal arrows represent time, while the vertical arrows represents the multiple channels or streams in a MU MIMO/FDMA configuration. The boxes represent data frames sent by a wireless device (e.g., an AP or an STA) while the dashed lines along the time axis represent intervals or time slots.

When an STA 120 has enabled power save mode (i.e. the STA 120 is "asleep") its antennas 252 are disabled to reduce power consumption. Consequently, the STA 120 cannot receive packets. The AP 110 will buffer the packets destined for each sleeping STA 120. Included in each beacon frame from the AP 110 is a traffic indication map (TIM) field. The TIM field is a bitmap used to indicate that packets destined for a sleeping STA 120 are buffered at the AP 110. The STA 120 may wake up at intervals to receive beacon frames from AP 110 along with the TIM. The STA 120 may determine that the TIM indicates the STA's 120 association ID (AID) and the STA 120 may send a PS-Poll frame to the AP 110. The AP 110 may assign an AID to the STA 120 when the STA 120 associates with the AP 110. The AP 110 may assign each STA 120 a unique AID. Each bit in the TIM may correspond to traffic buffered for a specific STA 120 that the AP 110 is prepared to deliver. For example, bit number N in the TIM may indicate whether the AP 110 has traffic buffered to send to the STA 120 whose assigned AID is N. As such, the TIM may include an order of stations based on an AID assigned to each STA 120 by the AP 110. For example, an STA 120 assigned a lower AID may come before an STA 120 assigned a higher AID value in the order of stations in the TIM.

In response to receiving the PS-Poll, the AP 110 may send the first buffered frame to STA 120. The AP 110 may also indicate whether the AP 110 has more data buffered for the STA 120. The STA 120 may receive the indication of more data from the AP 110 and may continue to send PS-Polls to the AP 110 until the AP 110 no longer indicates that there is more data. At this point the STA 120 may return to power save mode. There is also the possibility that the AP 120 will have discarded the buffered packets destined for the STA 120. In this case the TIM will no longer indicate the station's AID and STA 120 may return to power save mode.

Figure 4:
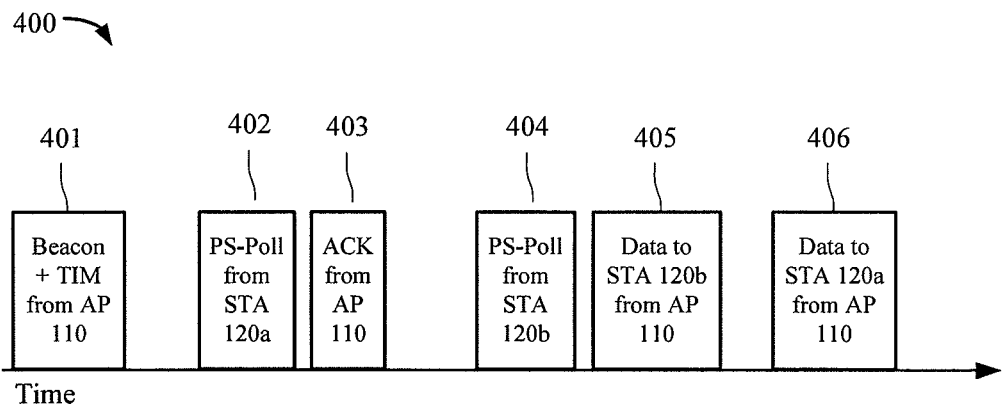
FIG. 4 is a time sequence diagram of a power save polling procedure in which uplink (UL) multi-user (MU) multiple-input multiple-output (MIMO)/UL frequency division multiple access (FDMA) is not implemented.

FIG. 4 is a time sequence diagram 400 of a power save polling procedure between an AP 110 and multiple STAs 120 not configured for UL MU MIMO or UL FDMA. In this procedure, the AP 110 sends a beacon frame 401 including a TIM field to all of the STAs 120. The TIM field may indicate that the AP 110 has traffic buffered to send to a first STA 120a and to a second STA 120b. The first STA 120a may receive the beacon frame 401 from the AP 100 and send a PS-Poll frame 402 to the AP 110 in response. The AP 110 may respond to the received PS-Poll from the first STA 120a by sending an acknowledgement ("ACK") frame 403. The second STA 120b may also receive the beacon frame 401 from the AP 110 and may send a PS-Poll 404 to the AP 110 in response. Having received the PS Polls 402 and 404 from the first and second STAs 120a and 120b, the AP may determine that the first and second STAs 120a and 120b are awake. The AP 110 may send data buffered for the second STA 120b to the second STA 120b in a data frame 405 and may subsequently send data buffered for the first STA 120a to the first STA 120a in a data frame 406. The result of this process is that each STA 120 sends its PS-Poll separately, taking up additional airtime, and hence reducing overall network efficiency. A process in which the first and second STA 120 concurrently send their PS-Polls would reduce the overall transmission time and improve network efficiency.

Figure 5:
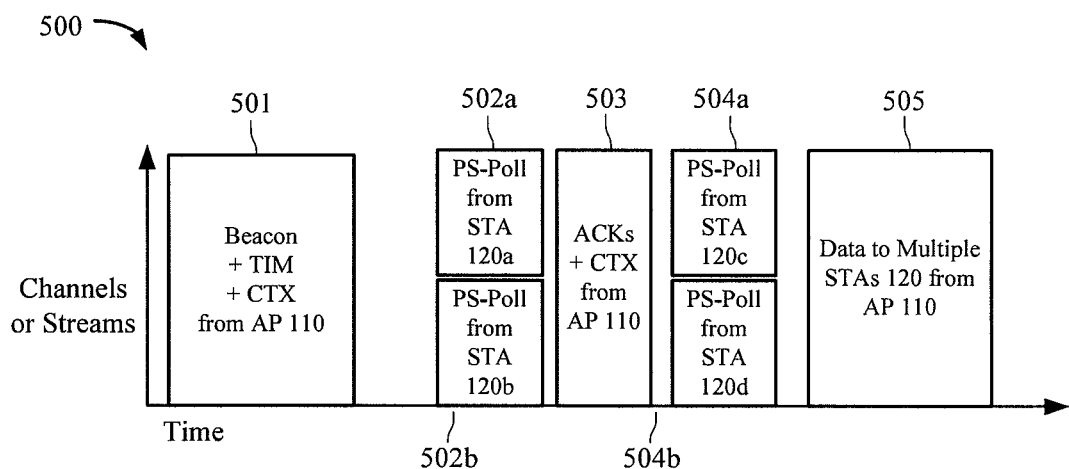
FIG. 5 is a time sequence diagram of a power save polling procedure utilizing UL MU MIMO/UL FDMA.

FIG. 5 is a time sequence diagram 500 of a power save polling procedure utilizing UL MU MIMO or UL FDMA to improve network efficiency. The power save polling procedure of FIG. 5 may be performed in the MIMO system 100 described above. In this procedure, the AP 110 may transmit a beacon 501 including a TIM field and a clear-to-transmit (CTX) element. The TIM may indicate that the AP 110 has buffered data to send to a first STA 120a, a second STA 120b, a third STA 120c, and a fourth STA 120d. The beacon 501 provides UL MU MIMO or UL FDMA parameters for the STAs 120 that are indicated in the TIM field as having DL data pending at the AP 110. In this procedure, the CTX element may indicate that the first STA 120a and the second STA 120b are clear to transmit. In response to receiving the CTX from the AP 110, the first STA 120a and the second STA 102b may use the UL MU MIMO/UL FDMA parameters provided in the CTX field of the beacon 501 to transmit their PS-Polls 502a and 502b concurrently, on different streams or channels. In this procedure, the beacon 501 including the CTX element acts as a trigger for the first STA and the second STA to send their PS-Polls 502a and 502b. The AP 110 may respond to the PS-Polls 502a and 502b by sending an ACK frame 503 sent to the first and second STAs 120a and 120b either in DL MU MUMO, DL FMDA, or as a multicast ACK frame.

As described above, the AP 110 may also have data buffered to send to the third STA 120c and the fourth STA 120d. The AP 110 may use the ACK frame 503 to trigger a set of UL MU MIMO or UL FMDA PS-Polls from the third and fourth STAs 120. For example, the AP 110 may include a CTX element in the ACK frame 503. The CTX element in the ACK frame 503 may clear the third and fourth STAs 120c and 120d to transmit. The UL MU MIMO/UL FDMA parameters for the third and fourth STAs 120c and 120d may have been previously defined in the beacon 501 as described above. Alternatively, the ACK frame 503 including the CTX field may further include the required parameters for MU MIMO or FDMA transmissions. In response to receiving the ACK 503 including the CTX field, the third and fourth STAs 120c and 120d may concurrently transmit their PS-Polls 504a and 504b to the AP 110 using UL MU MIMO/UL FDMA. In response to receiving the PS-Polls 502a, 502b, 504a, and 504b from the first, second, third, and fourth STAs 120a-d, the AP may determine that the STAs 120a-d are awake and the AP 110 may send downlink data to multiple STAs 120. For example, the AP 110 may respond to each of the PS-Polls 502a, 502b, 504a, and 504b from the first, second, third, and fourth STAs 120a-d directly with a data frames 505. The AP 110 may send the data frames 505 to each STA 120a-d using either DL single user (SU) or MU transmissions. As shown in FIG. 5, both the beacon 501 and the DL ACK 503 sent by the AP 110 may serve as a trigger for a UL MU MIMO/UL FDMA transmission for particular stations. Furthermore, in other embodiments, any DL packet from the AP 110 can serve as the trigger for a UL MU MIMO/UL FDMA transmission by including the CTX element.

The UL MU MIMO/UL FDMA configuration depicted in FIG. 5 has advantages not provided by the configuration of FIG. 4. As shown in FIG. 5, by utilizing UL MU MIMO or UL FDMA, multiple STAs 120 can transmit PS-Polls concurrently. This reduced the amount of time needed for STAs 120 to send their PS-Polls.

Figure 6A:
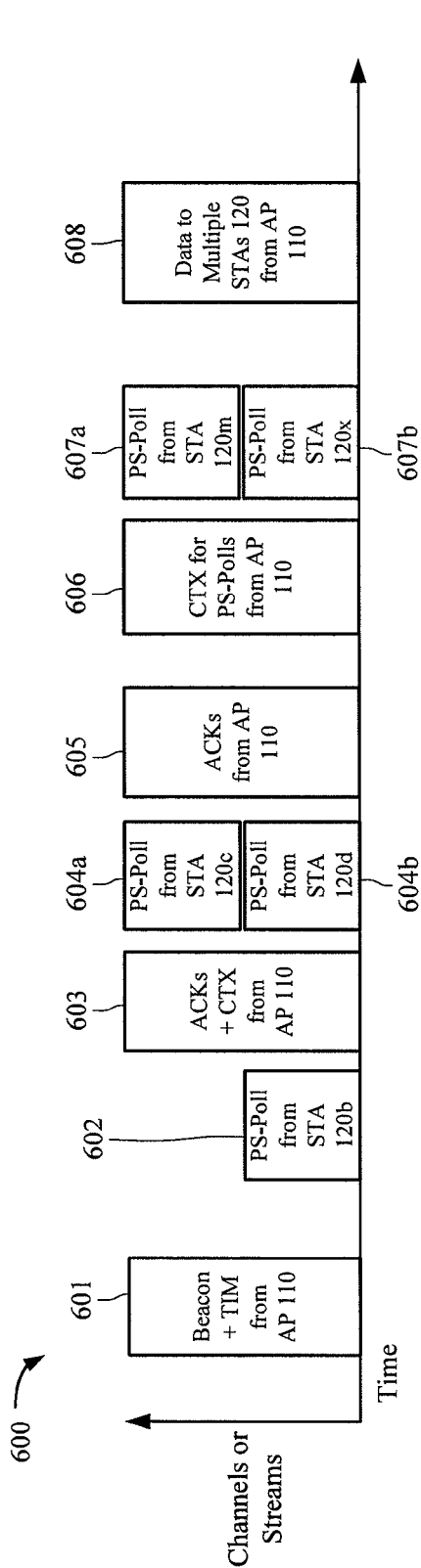
FIG. 6A is a time sequence diagram of a power save polling procedure utilizing UL MU MIMO/UL FDMA.

FIG. 6A is a time sequence diagram 600 of a power save polling procedure utilizing UL MU MIMO or UL FDMA to improve network efficiency. The power save polling procedure of FIG. 6A may be performed in the MIMO system 100 described above. In this procedure, an AP 110 may send a beacon frame 601 including a TIM. The TIM may indicate that the AP 110 has buffered data to send to a first STA 120a, a second STA 120b, a third STA 120c, a fourth STA 120d, a fifth STA 120m, and a sixth STA 120x. The first STA 120a may be in power save mode and may not receive the beacon frame 601. The second STA 120b may receive the beacon frame 601 from the AP 110 and may determine from the TIM field that the AP 110 has data pending for the second STA 120b. The second STA 120b may send a PS-Poll frame 602 to the AP in response to determining whether the AP 110 has data pending for the second STA 120b. The PS-Polls described herein may be transmitted with a short interframe space (SIFS), without using contention. In this procedure, the beacon frame 601 may not provide UL MU MIMO/UL FDMA parameters (e.g., in a CTX element). As such, the second STA 120b transmits the PS-Poll 602 in a non-multiple access format. The AP 110 may receive the PS-Poll 602 from the second STA 120b and may respond with an ACK 603 including a CTX element. ACKs sent by the AP 110 in response to a PS-Poll (e.g., ACK 603) may be transmitted with SIFS, without contention. The CTX element in the ACK 603 may clear the third STA 120c and the fourth STA 120d to transmit their PS-Polls. The ACK 603 including the CTX acts as a trigger for UL MU MIMO/UL FDMA transmission from the third and fourth STAs 120c and 120d. The ACK 603 may also include UL MU MIMO/UL FDMA parameters. The third and fourth STAs 120c and 120d may receive the ACK frame 603 and, in response, may concurrently transmit PS-Polls 604a and 604b, respectively. The AP 110 may receive the PS-Polls 604a and 604b and may respond by sending an ACK 605.

As described above, the AP 110 may also have data pending for the fifth STA 120m and the sixth STA 120x. The AP 110 may transmit a CTX frame 606 to fifth and sixth STAs 120m and 120x. The CTX frame 606 is not included in a beacon frame or an ACK frame, but rather is sent as a stand-alone frame. As described above, the CTX may be sent in any DL transmission from the AP 110. The CTX frame 606 may be sent either with SIFS or with backoff contention. The CTX frame 606 may act as a trigger for the fifth STA 120m and the sixth STA 120x to concurrently transmit PS-Polls 607a and 607b, respectively. The AP 110 may receive the PS-Polls 607a and 607b. The AP 110 may respond to all, or some, of the PS-Polls 602, 604a, 604b, 607a, and 607b, from the STAs 120a-d, 120m, and 120x by sending data frames 608 including the buffered data for the STAs 120a-d, 120m, and 120x. The AP 110 may send data to each STA 120 using either DL single user (SU) or MU transmissions.

Figure 6B:
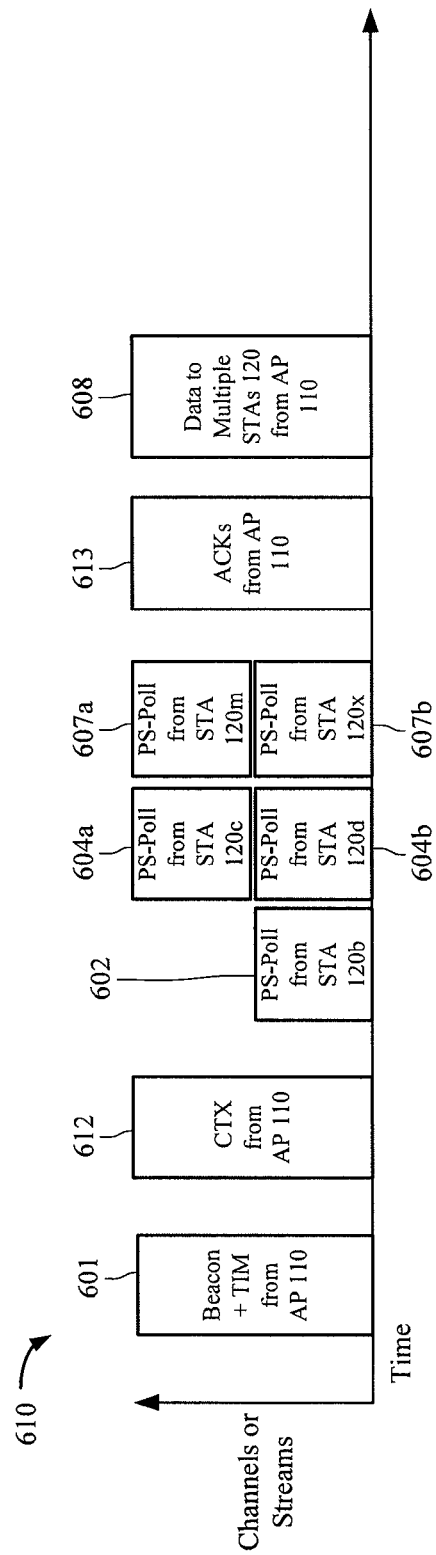
FIG. 6B is a time sequence diagram of a power save polling procedure utilizing UL MU MIMO/UL FDMA.

FIG. 6B is a time sequence diagram 610 of a power save polling procedure utilizing UL MU MIMO or UL FDMA to improve network efficiency. The procedure in FIG. 6B is similar to that described above with reference to FIG. 6A. One difference between the procedure shown in FIG. 6B and the procedure shown in FIG. 6A is that in FIG. 6B, the AP 110 may transmit a CTX frame 612 to the STAs 120 after transmitting the beacon frame 601. The CTX frame 612 may provide UL MU MIMO/UL FDMA parameters and may clear the STAs 120a-c, 120m, and 120x to transmit their PS-Polls. As such, the CTX frame 612 acts as a trigger for transmission of the PS-Poll 602 from STA 120b, the PS-Poll 604a from STA 120c, the PS-Poll 604b from STA 120d, the PS-Poll 607a from STA 120m, and the PS-Poll 607b from STA 120x. The AP 110 may respond to the PS-Polls from the STAs 120 by transmitting ACKs 613 to the STAs 120. The AP 110 may then transmit data frames 608 to multiple STAs 120.

In the procedures described above with reference to FIGS. 6A and 6B, the AP 110 may transmit additional CTX frames to the STAs 120 to trigger further UL MU MIMO PS-Polls from the STAs 120. The AP 110 may transmit the additional CTX frames within the same transmission opportunity as the CTX 612 or the AP 110 may perform contention access to transmit the additional CTX frames. The STAs 120 may also perform contention access to transmit their PS-Polls, which may conflict with the operation of the AP 110 (e.g., a CTX frame transmitted by the AP 110 may collide with a PS-Poll transmitted by an STA 120). When frames are sent with contention, a collision may occur. By contrast, when frames are sent with SIFS, a collision may not occur. In order to reduce the collision probability and improve network efficiency, the STAs 120 may have a lower priority in accessing the wireless network medium compared to the AP 110. For example, the wireless network medium may be reserved so that only the AP 110 can access the medium or the STAs 120 may be provided with lower priority contention parameters (e.g., arbitration inter-frame spacing number or minimum contention window parameters).

Figure 7:
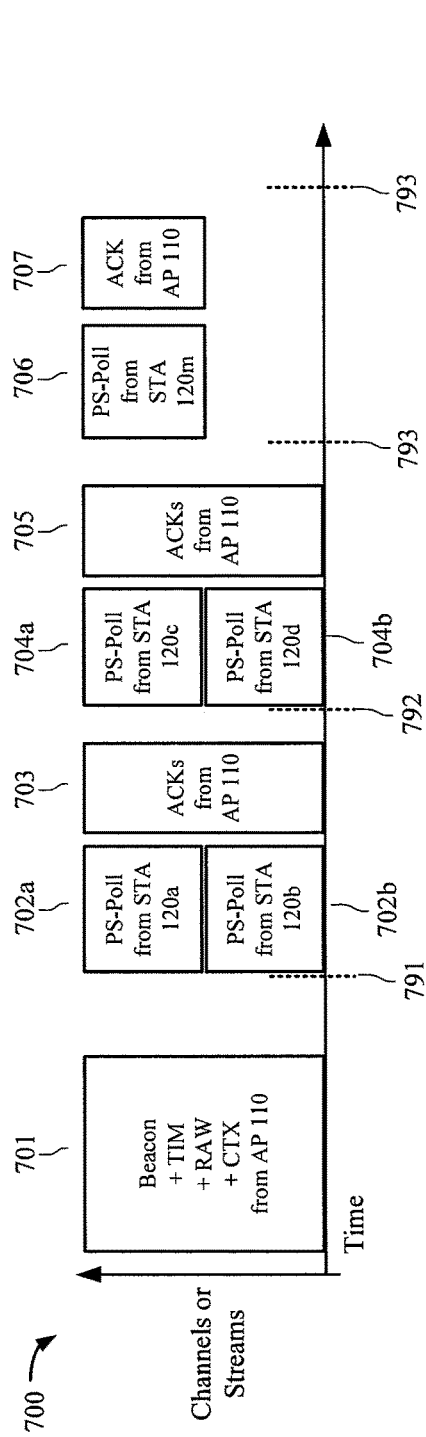
FIG. 7 is a time sequence diagram of a power save polling procedure utilizing UL MU MIMO/UL FDMA and scheduling.

FIG. 7 is a time sequence diagram 700 of a power save polling procedure utilizing UL MU MIMO/UL FDMA and restricted access window (RAW) information to improve network efficiency. The power save polling procedure of FIG. 7 may be performed in the MIMO system 100 described above. In this procedure, an AP 110 may transmit a beacon 701 including a TIM, a RAW element, and a CTX. The TIM may indicate that the AP 110 has buffered data to send to a first STA 120a, a second STA 120b, a third STA 120c, a fourth STA 120d, a fifth STA 120m, and a sixth STA 120x. The RAW element may define windows or slots of time where certain STAs 120 cannot transmit, thereby enabling the AP 110 to create scheduled time slots in which certain other STAs 120 can transmit. In this configuration the STAs 120 transmit based on their time slot instead of transmitting based on a distance from a previous packet. The STAs 120 determine which time slot they may transmit during based upon a schedule, indicated by the RAW, included in the beacon frame 701. The dotted lines along the time axis in FIG. 7 indicate the time slot windows as indicated in the beacon frame 701. In other embodiments, the AP may set the network allocation vector (NAV) to define the scheduled time slots for each STA 120. The AP may set the NAV in the beacon 702 or in another frame sent immediately after the beacon 701. The STAs 120 that are scheduled for transmission in the CTX may ignore the NAV setting. The NAV setting may provide a schedule for STAs 120 (e.g., legacy STAs) that do not support SDMA. As such, this operation mode may provide protection and priority with respect to STAs that do not support SDMA.

The beacon frame 701 defines a schedule in which the first STA 120a and the second STA 120b will transmit during a first time slot starting at time 791 and ending at time 792. The schedule also indicates that the third STA 120c and the fourth STA 120d will transmit during a second time slot starting at time 792 and ending at time 793. The schedule also indicates that the fifth STA 120m will transmit during a third time slot starting at time 793 and ending at time 794. The AP 110 may provide MU MIMO/FDMA parameters for all of the STA 120 in the CTX element included in the beacon frame 701. According to the schedule indicated in the beacon frame 701, the first STA 120a and the second STA 120b may transmit their PS-Polls 702a and 702b to the AP 110 during the first time slot using UL MU MIMO/UL FDMA parameters indicated in the beacon frame 701. The AP 110 may responds to the PS-Polls 702a and 702b with ACK frames 703. According to the schedule indicated in the beacon frame 701, the third STA 120c and the fourth STA 120d may concurrently transmit PS-Polls 704a and 704b using UL MU MIMO/UL FDMA indicated in the beacon frame 701. The AP 110 may respond to the PS-Polls 704a and 704b with ACK frames 705. According to the schedule indicated in the beacon frame 701, the fifth STA 120m may transmit a PS-Poll 706, which does not overlap in time with a PS-Poll from any other station. For example, at least a portion of the PS-Poll 706 is not transmitted over an overlapping time with transmission of at least a portion of another PS-Poll. The sixth STA 120x may have been scheduled to transmit with the fifth STA 120m, but the sixth STA 120x may not be awake and may not have received the beacon frame 701. The AP 110 may receive the PS-Poll 706 from the fifth STA 120m and may respond with an ACK frame 707. As shown in FIG. 7, the schedule defined by the beacon frame 701 may improve network efficiency by scheduling concurrent transmission of PS-Polls. The schedule improves network efficiency because a DL transmission from the AP 110 containing a CTX is not required to trigger the transmission of MU MIMO/FDMA PS-Polls. This configuration reduces possible delays that might be incurred if the CTX is not received by an STA 120 for whatever reason. Scheduling may also be useful where the ability of stations to send PS-Polls independently has been disabled.

Figure 8:
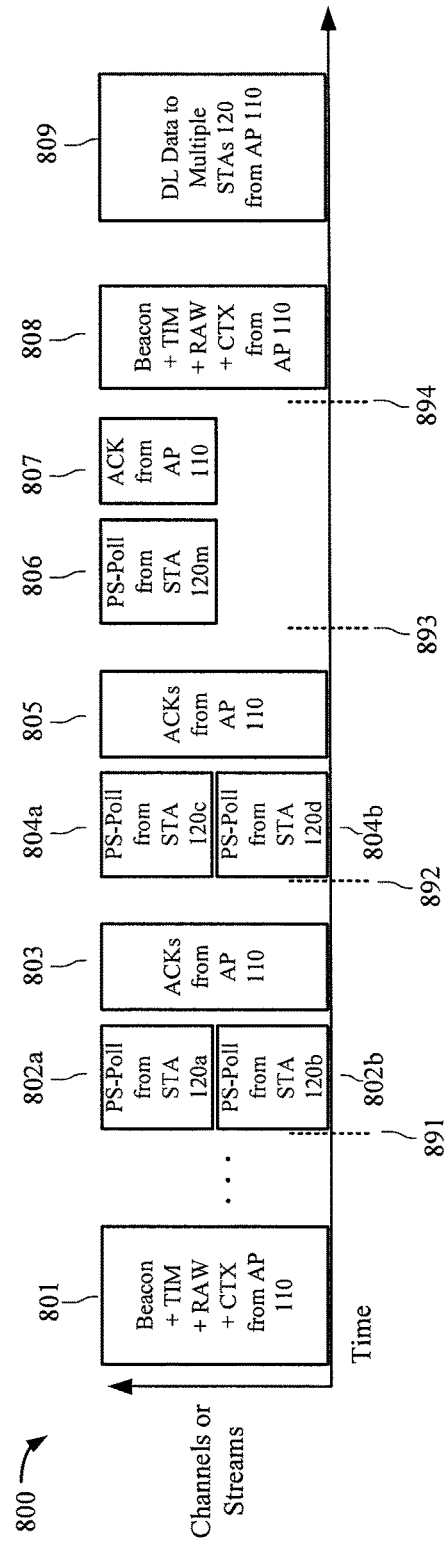
FIG. 8 is a time sequence diagram of a power save polling procedure utilizing UL MU MIMO/UL FDMA and scheduling.

FIG. 8 is a time sequence diagram 800 of a power save polling procedure utilizing UL MU MIMO/UL FDMA and scheduling of PS-Polls to improve network efficiency. The power save polling procedure of FIG. 8 may be performed in the MIMO system 100 described above. The AP 110 may transmit a beacon frame 801 including a TIM, a RAW, and a CTX element. The TIM may indicate that the AP 110 has buffered data to send to a first STA 120a, a second STA 120b, a third STA 120c, a fourth STA 120d, a fifth STA 120m, and a sixth STA 120x. As shown in FIG. 8, the schedule defined by the RAW in the beacon frame 801 may set the STAs 120a-d, 120m, and 120x to transmit their PS-Polls in time slots which are immediately before a subsequent beacon frame 808. The RAW element may indicate a schedule for the first STA 120a and the second STA 120b to concurrently transmit PS-Polls 802a and 802b, respectively, in a first time slot, starting at time 891 and ending at time 892, according to the UL MIMO/UL FDMA parameters set in the beacon frame 801. The AP 110 may receive the PS-Polls 802a and 802b and respond by transmitting ACKs 803. In a second time slot starting at time 892 and ending at time 893, the third STA 120c and the fourth STA 120d may concurrently transmit PS-Polls 804a and 804b, respectively, to the AP 110 according to the schedule indicated in the RAW element. The AP 110 may respond to the PS-Polls 804a and 804b with ACKs 805. During a third time slot starting at time 893 and ending at time 894, the fifth STA 120m may transmit PS-Poll 806 to the AP 110 and the AP 110 responds with ACK 807. The sixth STA 120x may have been identified in the TIM as having data pending at AP 110 and may have been scheduled to transmit a PS-Poll during the third time slot concurrently with STA5. However, STA6 may have been sleeping and may not have received the beacon frame 801.

The procedure of FIG. 8 is beneficial because scheduling the STAs 120 to send their PS-Polls just before the next beacon 808 allows the AP 110 to know which STAs 120 are sleeping so that the AP 110 will not address the sleeping STAs 120 in that beacon 808. As shown in FIG. 6A, since the sixth STA 120x was sleeping and did not receive the beacon 801, the AP 110 may not schedule the sixth STA 120x in the subsequent beacon 801. One benefit this configuration provides is that the AP 110 is able to address stations that it knows are awake and can delay addressing stations that it knows are asleep, thereby improving network efficiency since the sleeping STAs 120 are not scheduled in time slots that they will not use. This configuration also allows the TIM field of the subsequent beacon 808 to be shorter since it will not address the STAs 120 known to be sleeping.

As described above, the RAW element of the beacon may be used to define a schedule. In addition, the TIM bitmap may be used instead to implicitly schedule stations according to their position in the TIM. In one example implicit scheduling scheme, the first station listed in the TIM may use the first channel/stream, the second station listed in the TIM may use the second channel/stream, and so on. However, the implicit schedule may be determined in any appropriate manner based on the TIM bitmap. When a channel/stream for a particular time slot becomes full the remaining stations that need to transmit PS-Polls may use subsequent time slots that are not full.

Figure 9:
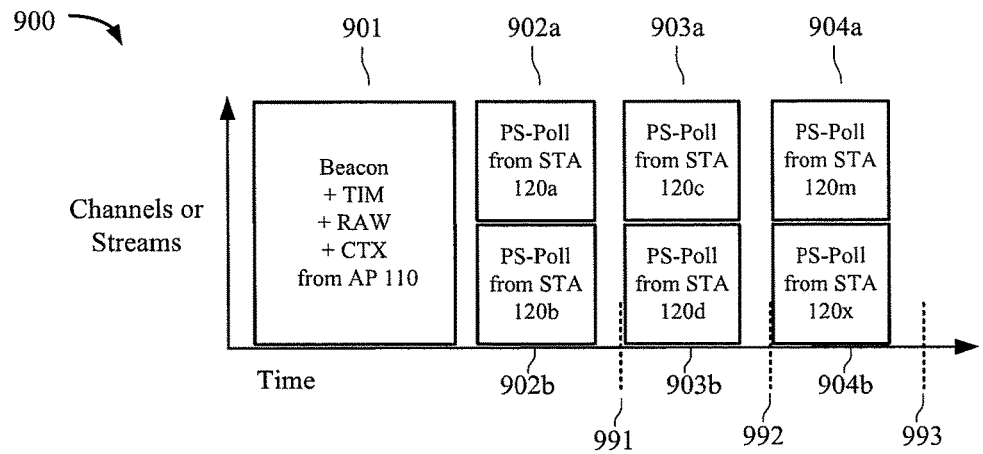
FIG. 9 is a time sequence diagram of a power save polling procedure utilizing UL MU MIMO/UL FDMA and implicit scheduling.

FIG. 9 is a time sequence diagram 900 of a power save polling procedure using implicit scheduling based on a TIM. The power save polling procedure of FIG. 9 may be performed in the MIMO system 100 described above. The AP 110 may transmit a beacon frame 901 including a TIM, a RAW, and a CTX element. A bitmap of the TIM may indicate, in order, that the AP 110 has buffered data to send to a first STA 120a, a second STA 120b, a third STA 120c, a fourth STA 120d, a fifth STA 120m, and a sixth STA 120x. The six STAs 120a-d, 120m, and 120x may determine an implicit schedule based on the TIM. The STAs 120 may determine their order in the PS-Polling schedule based on their order in the TIM. The beacon 901 may schedule the first STA 120a and the second STA 120b to concurrently transmit their PS-Polls 902a and 902b immediately after receiving the beacon frame 901. The implicit schedule may set the third STA 120c and the fourth STA 120d to concurrently transmit their PS-Polls 903a and 903b in a first time slot starting at time 991 and ending at time 992. The implicit schedule may set the fifth STA 120m and the sixth STA 120x to concurrently transmit their PS-Polls 904a and 904b in the subsequent time slot starting at time 992 and ending at time 993. A RAW field may still be included in the beacon frame 901 to silence other STAs while the schedules STAs send their PS-Polls. A CTX element included in the beacon frame 901 may be used to delineate the parameters needed for UL MU MIMO/UL-FDMA transmission. The timing and number of STAs scheduled to transmit PS-Poll messages may either be indicated in a schedule provided by the beacon frame or may be predetermined.

Figure 10:
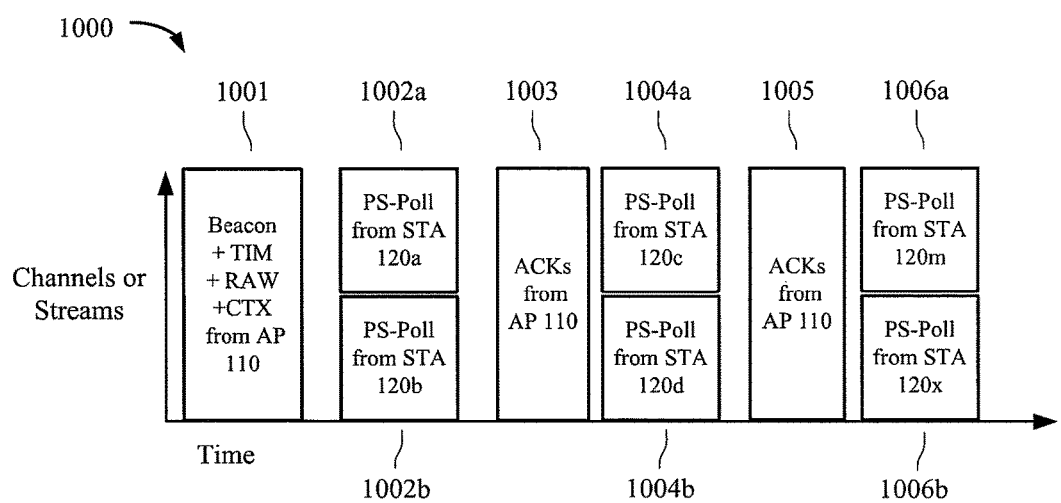
FIG. 10 is a time sequence diagram of a power save polling procedure utilizing UL MU MIMO/UL FDMA, downlink triggers, and implicit scheduling.

FIG. 10 is a time sequence diagram 1000 of a power save polling procedure using both DL triggers and implicit scheduling. The power save polling procedure of FIG. 10 may be performed in the MIMO system 100 described above. The AP may transmit a beacon frame 1001 including a TIM, a RAW, and a CTX element. The TIM may indicate an implicit schedule that does not correspond to exact time slots, but rather to an ordering of groups of stations which are triggered by DL packets. The TIM may indicate that the AP 110 has buffered data to send to a first STA 120a, a second STA 120b, a third STA 120c, a fourth STA 120d, a fifth STA 120m, and a sixth STA 120x. The RAW may be used to silence STAs not scheduled to send PS-Polls and the CTX element may include UL-MU-MIMO/UL FDMA parameters to be used by the STAs. The CTX element in the beacon frame 1001 may acts as a trigger for the first STA 120a to send its PS-Poll 1002a and for the second STA to send its PS-Poll 1002b to the AP 110. The AP 110 may respond to the PS-Polls 1002a and 1002b by sending an ACKs frame 1003. The ACKs frame 1003 may act as a trigger for the third STA 120c to send its PS-Polls 1004a and for the fourth STA 120d to send its PS-Poll 1004b. The AP 110 may respond to the PS-Polls 1004a and 1004b with an ACKs frame 1005. The ACKs frame 1005 may act as a trigger for the fifth STA 120m and the sixth STA 120x to transmit their PS-Polls 1006a and 1006b, respectively. As described above, the ACK from the AP 110 to certain STAs may be used to trigger PS-Polls from other STAs.

Figure 11:
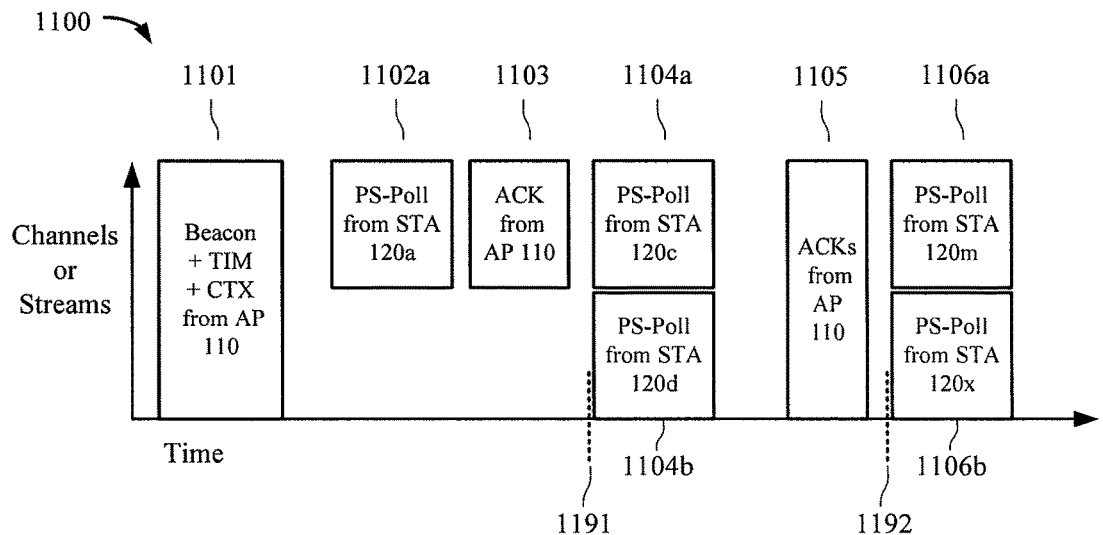
FIG. 11 is a time sequence diagram of a power save polling procedure utilizing UL MU MIMO/UL FDMA and implicit scheduling.

FIG. 11 is a time sequence diagram 1100 of a power save polling procedure using implicit scheduling based on a TIM. The power save polling procedure of FIG. 11 may be performed by the MIMO system 100 described above. The AP 110 may transmit a beacon frame 1101 including a TIM and a CTX element. The TIM may indicate that the AP 110 has buffered data to send to a first STA 120a, a second STA 120b, a third STA 120c, a fourth STA 120d, a fifth STA 120m, and a sixth STA 120x. As described above, the TIM may include an order of stations. For example, the order of stations may be based on an AID assigned to each STA 120 by the AP 110. The STAs 120 may be configured to implicitly schedule time slots for transmitting PS-Polls based on the order of stations in the TIM. For example, an STA 120 having a lower AID may schedule a time slot for transmitting it PS-Poll before a STA 120 having a higher AID. The second STA 120b may be listed in the TIM but it may be asleep and may not receive the beacon frame 1101. The beacon frame 1101 may trigger the first STA 120a to immediately transmit its PS-Poll 1102a while the second STA 120b may not send its PS-Poll. The AP 110 may respond to the PS-Poll 1102a with an ACK 1103 that does not act as a trigger for the transmission of PS-Polls. Instead, the TIM implicitly schedules the third STA 120c and the fourth STA 120d to transmit PS-Polls 1104a and 1004b, respectively, in a first time slot starting at time 1191 and ending at time 1192. The AP 110 may respond to the received PS-Polls 1104a and 1104b with ACKs 1105 that does not act as a trigger for PS-Poll transmission. The TIM may indicate a second time slot, starting at time 1192, in the implicit schedule. The fifth STA 120m and the sixth STA 120x are triggered by the implicit schedule to concurrently transmit their PS-Polls 1106a and 1106b, respectively, during the second time slot at time 1192. The beacon frame 1101 may also include a RAW element configured to silence non-scheduled STAs, and the beacon frame 1101 may use the CTX element to indicate parameters for the UL MU MIMO/UL FDMA transmission of PS-Polls.

Figure 12:
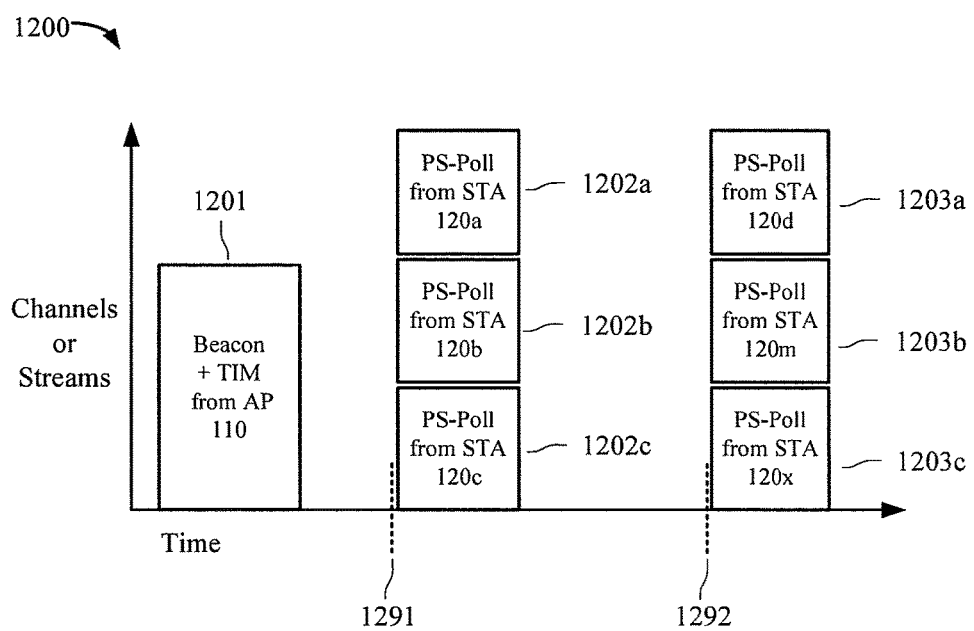
FIG. 12 is a time sequence diagram of a power save polling procedure utilizing UL MU MIMO/UL FDMA and implicit scheduling.

FIG. 12 is a time sequence diagram 1200 of a power save polling procedure using implicit scheduling based on a TIM. The power save polling procedure of FIG. 12 may be performed in the MIMO system 100 described above. The AP 110 may transmit a beacon frame 1201 including a TIM. The TIM may indicate that the AP 110 has buffered data to send to a first STA 120a, a second STA 120b, a third STA 120c, a fourth STA 120d, a fifth STA 120m, and a sixth STA 120x. The AP 110 may be configured to have 80 MHz total bandwidth and a bandwidth chunk size may be 20 MHz or less. This configuration allows three stations to transmit concurrently using UL FDMA since the three combined 20 MHz or less bandwidth chunk sizes are less than the 80 MHz total bandwidth. An implicit schedule set by the TIM in the beacon frame 1201 may act as a trigger for the first, second, and third STAs 120a-c to concurrently transmit PS-Polls 1202a, 1202b, and 1202c, respectively at time 1291. Each of the STAs 120a-c may transmit their PS-Polls using 20 MHz or less of the entire 80 MHz bandwidth. The implicit schedule may indicate a second time slot starting at time 1292 during which the fourth, fifth, and sixth STAs 120d, 120m, and 120x are scheduled to concurrently transmit their respective PS-Polls 1203a, 1203b, and 1203c. As described above, the PS-Polls may also be triggered by other DL frames.

In the embodiments described above with reference to FIGS. 5-12, the PS-Poll frame may be substituted by other types of frames. For example, a quality of service null frame, a data frame, a management frame, a control frame, or any other frame may be provided to indicate to AP that the STA is awake.

Figure 13:
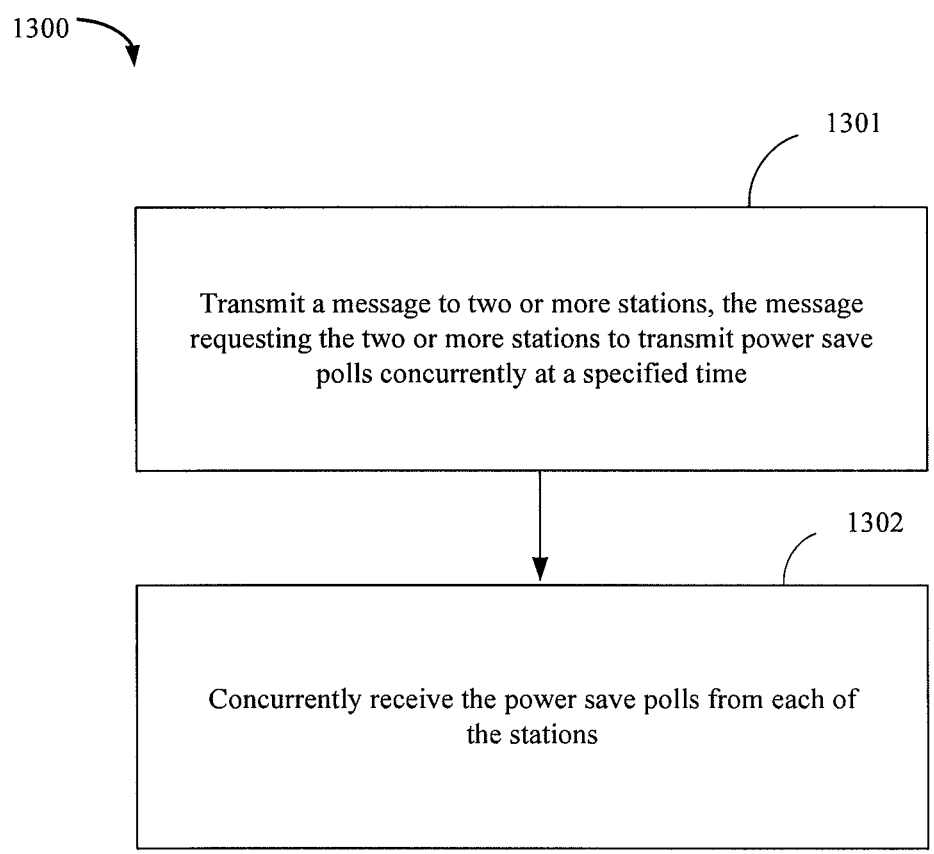
FIG. 13 is a flow chat of an aspect of a method for providing wireless communication utilizing UL MU MIMO/UL FDMA.

FIG. 13 is a flow chart 1300 of an aspect of a method for providing wireless communication in accordance with certain embodiments described herein. As discussed above with respect to FIGS. 4-12, a person having ordinary skill in the art will appreciate that the method 1300 may be implemented by any suitable device or system. For example, the method may be implemented in the MIMO system 100 described above.

In operation block 1301 a message requesting two or more stations to transmit power save polls concurrently at a specific time is transmitted to those two or more stations. In operations block 1302 the power save polls from those stations are received concurrently.

In order to perform and implement the various procedures and embodiments described above, a device for wireless communication may be provided. The device may include means for transmitting a message to two or more stations, the message requesting the two or more stations to transmit power save polls concurrently at a specified time. The device may further include means for concurrently receiving the power save polls from each of the stations A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
   receiving, by a device, a first power save poll message from a first station;
   transmitting a message to the station and two or more additional stations, the message acknowledging in reception of the first power save poll and requesting the two or more stations to transmit additional power save polls concurrently at a specified time; and
   concurrently receiving the additional power save polls from the two or more stations.

2. The method of claim 1, wherein concurrently receiving includes receiving over an overlapping time at least a portion of the additional power save polls.

3. The method of claim 1, further comprising transmitting a second message, wherein the second message includes a schedule for each of the first and additional stations to transmit the power save polls.

4. The method of claim 3, wherein the second message comprises a traffic indication map and the schedule is defined based on the traffic indication map.

5. The method of claim 4, wherein the traffic indication map comprises a bitmap including an order of stations, the schedule for each station to transmit being determined based on the order.

6. The method of claim 3, wherein the second message indicates the concurrent transmissions of power save polls after a particular trigger, wherein the trigger is transmission of at least one of a beacon, an acknowledgement, and a downlink packet.

7. The method of claim 1, wherein the concurrently receiving of the additional power save polls comprises receiving at least one of uplink multi-user MIMO and uplink FDMA transmissions.

8. A device for wireless communication comprising:
a receiver configured to receive a first power save poll message from a first station; and
a transmitter configured to transmit a message to the station and two or more additional stations, the message acknowledging reception of the first power save poll and requesting the two or more stations to transmit additional power save polls concurrently at a specified time,
wherein the receiver is further configured to concurrently receiving the additional power save polls from the two or more stations.

9. The device of claim 8, wherein the receiver is configured to concurrently receive over an overlapping time at least a portion of the additional power save polls.

10. The device of claim 8, wherein the transmitter is further configured to transmit a second message including a schedule for each of the first station and the additional stations to transmit the power save polls.

11. The device of claim 10, wherein the second message comprises a traffic indication map and the schedule is defined based on the traffic indication map.

12. The device of claim 11, wherein the traffic indication map comprises a bitmap including an order of stations and the schedule for each station to transmit being determined based on the order.

13. The device of claim 10, wherein the second message indicates the concurrent transmissions of power save polls after a particular trigger, wherein the trigger is transmission of at least one of a beacon, an acknowledgement, and a downlink packet.

14. The device of claim 8, wherein the receiver is further configured to receive the additional power save polls using at least one of uplink multi-user MIMO and uplink FDMA transmissions.

15. A device for wireless communication comprising:
means for receiving, by a device, a first power save poll message from a first station;
means for transmitting an acknowledgement message to the station and two or more additional stations, the acknowledgement message acknowledging reception of the first power save poll and requesting the two or more stations to transmit additional power save polls concurrently at a specified time; and
means for concurrently receiving the additional power save polls from the two or more stations.

16. The device of claim 15, wherein the receiving means is configured to concurrently receive over an overlapping time at least a portion of the additional power save polls.

17. The device of claim 15, wherein the means for transmitting is further configured to transmit a second message including a schedule for each station to transmit the power save polls.

18. The device of claim 17, wherein the second message comprises a traffic indication map and the schedule is defined based on the traffic indication map.

19. The device of claim 17, wherein the second message indicates the concurrent transmissions of power save polls after a particular trigger, wherein the trigger is transmission of at least one of a beacon, an acknowledgement, and a downlink packet.

20. The device of claim 15, wherein the means for concurrently receiving the additional power save polls is configured to receive at least one of uplink multi-user MIMO and uplink FDMA transmissions.

21. A non-transitory computer readable medium comprising instructions that when executed cause a processor to:
receiving, by a device, a first power save poll message from a first station;
transmitting a message to the station and two or more additional stations, the message acknowledging in reception of the first power save poll and requesting the two or more stations to transmit additional power save polls concurrently at a specified time; and
concurrently receiving the additional power save polls from the two or more stations.

22. The computer readable medium of claim 21, wherein concurrently receiving includes receiving over an overlapping time at least a portion of the additional power save polls.

23. The computer readable medium of claim 21, wherein the instructions further cause the processor to transmit a second message including a schedule for each station to transmit the power save polls.

24. The computer readable medium of claim 23, wherein the second message comprises a traffic indication map and the schedule is defined based on the traffic indication map.

25. The computer readable medium of claim 21, wherein the second message indicates the concurrent transmissions of the additional power save polls after a particular trigger, wherein the trigger is transmission of at least one of a beacon, an acknowledgement, and a downlink packet.

26. The computer readable medium of claim 21, wherein the instructions to concurrently receive the power save polls cause the processor to receive the additional power save polls using at least one of uplink multi-user MIMO and uplink FDMA transmissions.

* * * * *